United States Patent [19]
Yoshimura

[11] Patent Number: 5,927,814
[45] Date of Patent: Jul. 27, 1999

[54] HEADREST

[75] Inventor: Masakazu Yoshimura, Akishima, Japan

[73] Assignee: Tachi-S Co., Ltd., Tokyo, Japan

[21] Appl. No.: 09/099,318

[22] Filed: Jun. 18, 1998

[51] Int. Cl.$^6$ ........................................................ A47C 7/36
[52] U.S. Cl. ..................... 297/391; 297/220; 297/DIG. 1
[58] Field of Search ..................................... 297/391, 397,
297/396, 410, 408, DIG. 1, DIG. 2, 452.18,
220; D6/356, 501, 502

[56] References Cited

U.S. PATENT DOCUMENTS

| 4,738,809 | 4/1988 | Storch | 297/DIG. 1 |
| 5,165,754 | 11/1992 | Louys | 297/391 |
| 5,405,190 | 4/1995 | Jeffcoat et al. | 297/DIG. 1 |

FOREIGN PATENT DOCUMENTS

| 63-290711 | 11/1988 | Japan . |
| 1135625 | 5/1989 | Japan . |
| 3115534 | 11/1991 | Japan . |
| 9271425 | 10/1997 | Japan . |
| 1053058 | 2/1998 | Japan . |

Primary Examiner—Peter M. Cuomo
Assistant Examiner—Anthony D Barfield
Attorney, Agent, or Firm—Browdy and Neimark

[57] ABSTRACT

A structure of donut-like headrest or the so-called "see-through-type headrest", wherein a headrest frame is provided, which has two spaced-apart stay portions and a head support portion larger in width than the two stay portions. Between those two stay and headrest support portions, there are defined a pair of spaced-apart slant portions. A connecting frame is connected between such pair of spaced-apart slant portions. Both of the head support portion and connecting frame are placed within a donut-like headrest body or trim cover assembly such as to surround the through-hole thereof in good proportion, with both two stay portions projecting externally from the headrest body. This allows for reducing the dimensions of headrest body uniformly towards the through-hole and in turn increasing the apparent size or diameter of through-hole in relation to the whole headrest body dimensions, thereby not only improving the aesthetic appearance of headrest, but also attaining a wide field of vision through and around the headrest body.

11 Claims, 2 Drawing Sheets

HEADREST

BACKGROUND OF INVENTION

1. Field of the Invention

The present invention generally relates to a headrest for use on a vehicle or automotive seat, and in particular to the structure of donut-like headrest or the so-called "see-through-type headrest" having a through-hole formed centrally thereof, which provides an aesthetically improved appearance and better permits a person to see through an opposite side of the headrest to through the through-hole.

2. Description of Prior Art

Among various kinds of headrests, a donut-like shape of headrest or the so-called "see-through-type headrest" has been made available, appealing to drivers and occupants on the automotive seat in terms of its attractive annular design and its central through-hole serving to widen the view or the field of vision, allowing an opposite side of the headrest to be easily viewed therethrough in the eyes of driver or occupant on the seat.

Conventionally, in the process of assembling this sort of headrest, it has been a common practice to use such generally inverted-U-shaped headrest frame having a cross bar frame or connecting frame extended therebetween, and place the same within a donut-like three-dimensional trim cover assembly before subjecting them all to a foaming process, as is typically known from the Japanese Laid-Open Patent Pubs. Nos. 63-290711 and 9-271425.

Reference is now made to FIG. 1 which shows a basic structure commonly obtained from the foregoing prior arts. Specifically, the headrest of this conventional kind is designated generally by (H'), which comprises a generally donut-like or annular three-dimensional trim cover assembly (2') having a through-hole (A) defined therein, a generally inverted-U-shaped headrest frame (1') whose headrest support portion (1'A) is placed and embedded in the trim cover assembly (2') integrally with a foam cushion member (3'). As shown, a pair of headrest stay portions (1'B)(1'B) of that headrest frame (1') are projected externally from the bottom wall (2'A) of trim cover assembly (2') and mounted in a seat back (SB) of vehicle or automotive seat.

In the illustrated mode of FIG. 1, there is employed such generally "U" shaped headrest frame (1') as typically seen from the Japanese Laid-Open Patent Pub. No. 63-290711, which has a pair of inwardly bent juncture points (1'C)(1'C) between the upper head support frame portion (1'A) and two straight stay portions (1'B)(1'B), with a connecting frame (12') connected between the two straight stay portions (1'B)(1'B) below the upper head support portion (1'A).

However, with this conventional headrest structure, the height-wise lower half area (W0) inevitably becomes large in relation to the whole height-wise dimension (W1) in the donut-like headrest body, because both connecting frame (12') and two inwardly bent juncture points (1'C) stated above occupy a relatively large area of headrest body below the through-hole (A), which inevitably requires enlarging the inner hollow volume of the corresponding lower half portion of trim cover assembly (1). As a consequence thereof, the through-hole (A) of resulting headrest becomes small relative to the whole area of headrest body, thus narrowing the field of vision that a driver or occupant on the seat can attain via the through-hole (A).

Further, the through-hole (A) per se must be of a certain fixed size to support the head of driver or occupant on the seat and can not be widen freely therefrom, taking into account an ordinary average size of driver's or person's head and a comfortable head support touch thereto.

The same problem as above goes for such mode of headrest as typically shown in the Japanese Laid-Open Patent Pub. No. 9-271425, which employs a genuine inverted "U" shaped headrest frame without such two inwardly bent juncture points (1'C). In this instance, a connecting frame is connected between a pair of spaced-apart straight stay portions below the inverted "U" shaped upper head support area, as a result of which, those two stay portions frame are spaced much wider from each other than the spacing of two stay portions (1'B) described above, which makes it impossible to reduce the annular dimension of headrest body in relation to the through-hole (A).

Hence, in the hitherto conventional structure of donut-like or see-through-type headrest, the whole dimensions of headrest body are inevitably large in relation to the through-hole (at A) formed centrally thereof, which prevents attaining of a wide field of vision around the headrest for a person to see the opposite side therebeyond and also imbalances the whole annular appearance of headrest body, impairing thus its outer aesthetic appearance.

SUMMARY OF THE INVENTION

In view of the above-discussed drawbacks, it is therefore a primary purpose of the the present invention to provide an improved structure of donut-like headrest which permits for reducing its whole dimensions with a good compact appearance and enlarging the apparent size or diameter of its through-hole relative to the whole dimension thereof.

In order to achieve such purpose, the headrest in accordance with the present invention is basically comprised of:

a generally donut-like body of headrest having a through-hole formed therein;

a headrest frame means having a head support portion and a pair of spaced-apart stay portions adapted for mounting on the vehicle seat, wherein the head support portion is large in width relative to the pair of spaced-apart stay portions;

the headrest frame means including a pair of spaced-apart slant portions defined between the head support portion and pair of spaced-apart stay portions;

a connecting frame means; and both of the headrest frame means and connecting frame means being disposed within the body of headrest, with the connecting frame means connected between the two spaced-apart slant portions, in such a manner that the head support portion and connecting frame means surround the through-hole of headrest body, and that the two stay portions extend from the respective two slant portions, projecting externally from the body of headrest.

Accordingly, when the headrest frame means is placed in the headrest body, the closed annular area defined by the head support portion and connecting frame means surrounds the through-hole in good proportion. This effectively reduces the height-wise thickness of the lower area of headrest body (as indicated by (W2) in FIG. 2) relative to the whole height-wise dimension of headrest body, as compared with the prior-art headrest. Hence, the apparent size or diameter of through-hole (A) is made large, in the eyes of a person, in relation to the whole dimension of trim cover assembly (1) or headrest body, while at the same time, a space surrounding the headrest body is made wide to the eyes of person looking thereat around the whole body of headrest (H), thus enlarging the field of vision to the opposite side of headrest body. Preferably, a pair of inwardly bent juncture points may be defined between said pair of spaced-apart slant portion and said pair of stay portions thereof and situated in one wall of the headrest body to project the whole length of the stay portion therefrom.

All other structural features and advantages will become apparent from reading of descriptions hereinafter, with reference to the annexed drawings.

DETAILED DESCRIPTION OF PREFERRED EMBODIMENTS OF THE INVENTION

Figure 2:
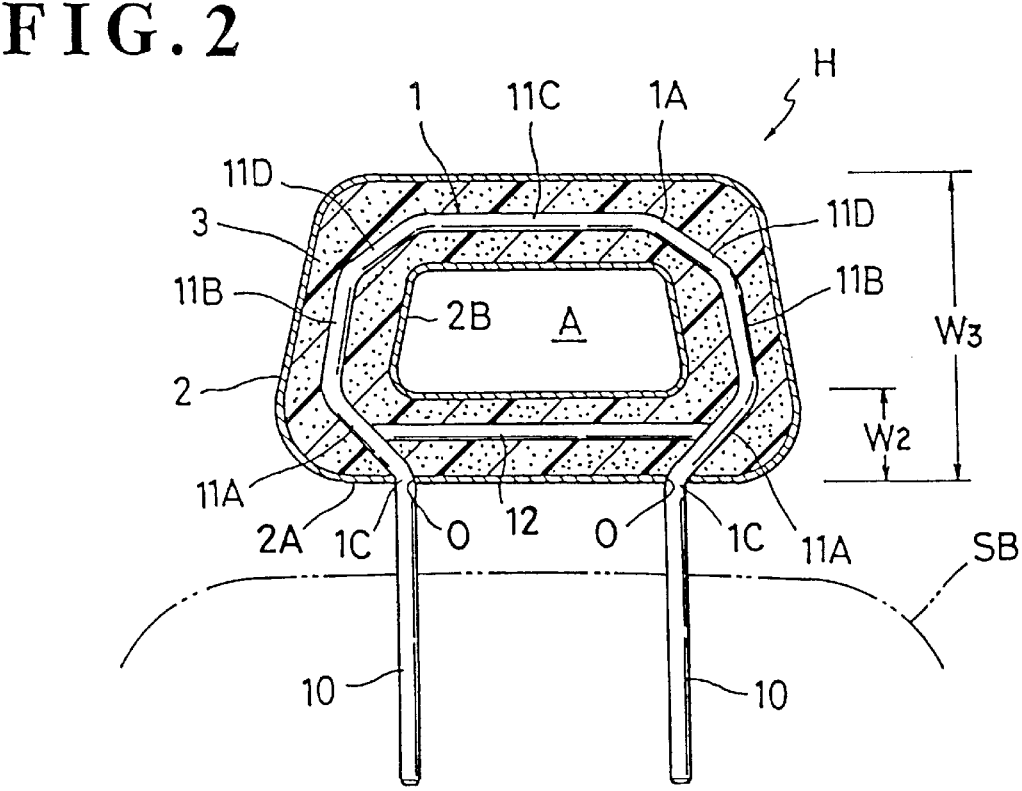
FIG. 2 is a schematic sectional view of donut-like headrest in accordance with the present invention.
Figure 3:
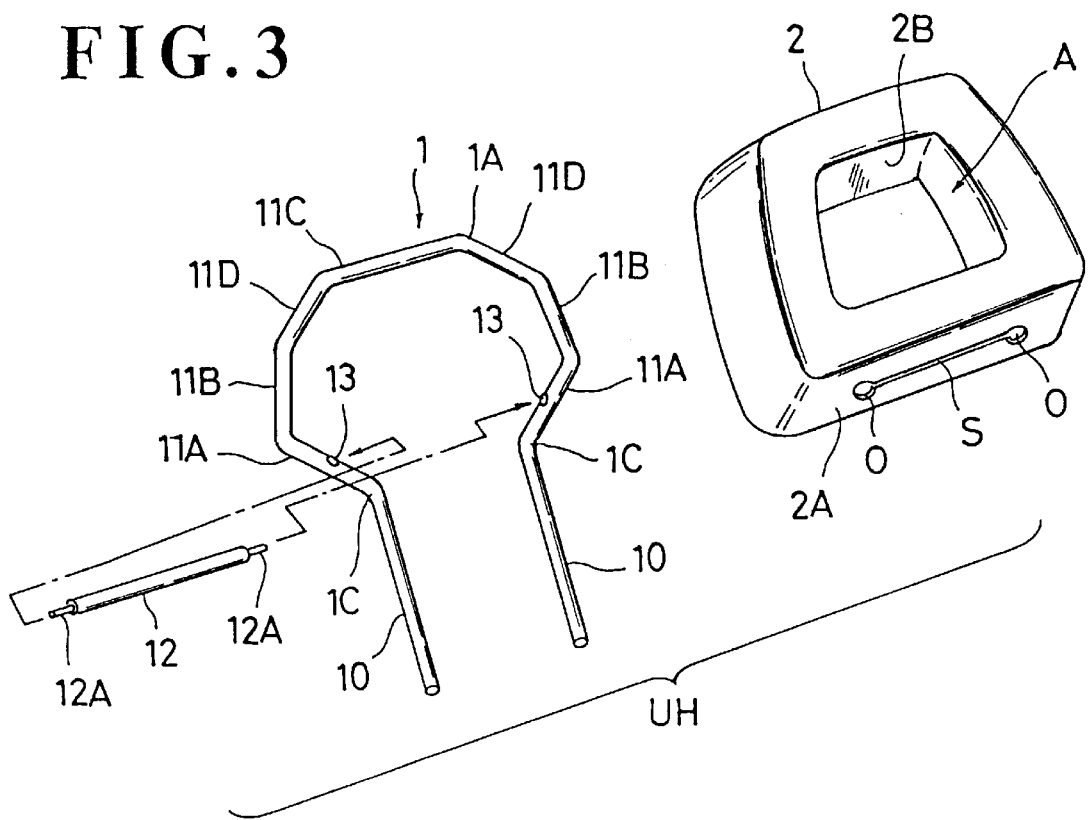
FIG. 3 is an exploded perspective view showing one example of principal elements of the headrest.
Figure 4:
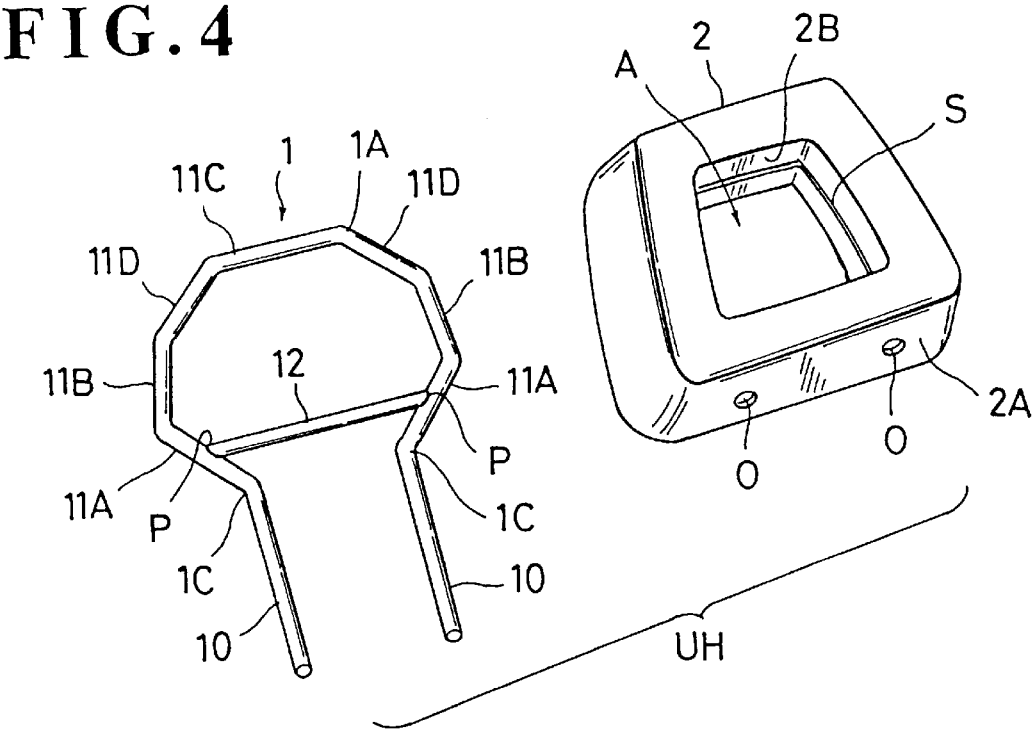
FIG. 4 is an exploded perspective view showing another alternative example of principal elements of the headrest.

Referring to FIGS. 2 to 4, there is illustrated a donut-like or the so-called "see-through-type" headrest in accordance with the present invention, which is generally designated by "H".

As shown in all the FIGS. 2 to 4, the generic mode of headrest (H) is basically based on: a generally annular or donut-like three-dimensional trim cover assembly (2); a generally annular-headed and inverted-U-shaped headrest frame (1); a connecting frame (12) and a foam cushion member (3).

Insofar as shown in the figures, the trim cover assembly (2) is of a generally donut-like shape having an inward annular wall (2B) which defines a through-hole (A) centrally thereof. The whole contour of trim cover assembly (2) is relatively rectangular. This is however just one exemplary mode of choice and not limitative, as will be explained in details later.

The headrest frame (1) may be generally formed by bending a rigid tubular or pipe material into the generally annular-headed and inverted-U-shaped configuration. From a generic point of view, insofar as shown in the figures, the headrest frame (1) is formed to have, defined therein, a generally annular-headed head support portion (1A), a pair of inwardly bent juncture points (1C)(1C) defined in one side of that head support portion (1A), and a pair of spaced-apart stay portions (10)(10) continuously extending from the respective pair of inwardly bent juncture points (1C)(1C), wherein the annular-headed head support portion (1A) is large in width relative to the pair of spaced-apart stay portions (10)(10). The two stay portions (10) are adapted for insertion into two headrest stay holes or holders (not shown) provided in the top of seat cushion (SB) of a vehicle or automotive seat, as well known in the art.

According to the specific modes shown in FIGS. 2 to 4, by way of example, the head support portion (1A) of headrest frame (1) is generally of a contour assuming an octagonal appearance close to an annular or semi-circular shape. Hence, as shown, the head support portion (1A) is formed by a horizontal upper frame section (11C), a pair of upper slant frame sections (11D)(11D) extending downwards on a slant from the respective two ends of that horizontal upper frame section (11C) in a symmetrical way relative thereto, a pair of generally vertical frame sections (11B)(11B) continuous in a generally vertical direction from the respective two upper slant frame sections (11D)(11D), and a pair of lower slant frame sections (11A)(11A) continuous downwards on a slant from the two ends of that generally vertical frame sections (11B) (11B). Of course, this is not limitative, and the head support portion (1A) may be formed in a desired more polygonal fashion than the illustrated octagonal manner as close to an annular or semi-circular shape as possible. In this respect, needless to mention, the rigid or metallic tubular or pipe material is technically hard to be curved into a complete circular or semi-circular shape, and therefore, it is easier and better to bend it stepwise in a polygonal way in terms of stability and costs in the practical assembly.

With that formation of headrest frame (1), the two lower slant frame sections (11A)(11A) are defined in a manner spaced apart from each other in the direction inwardly of the headrest frame (1) and in a mutually faced relation. In accordance with the present invention, as generally represented in FIG. 2, the connecting frame (12) is interposed and connected between those two inwardly slant frame sections (11A), to configure the head support portion (1A) in a closed annular fashion, providing a basic framework for allowing enclosure therearound of the generally annular or donut-like trim cover assembly (2) and a reinforcement to the headrest frame (1) itself.

While not shown, during the process of forming the present headrest (H), the trim cover assemlby (1) with the headrest frame (1) placed therein is subjected to a foaming process in order to create the foam cushion member (3) in the trim cover assembly (1), using a known foaming die device.

Figure 1:
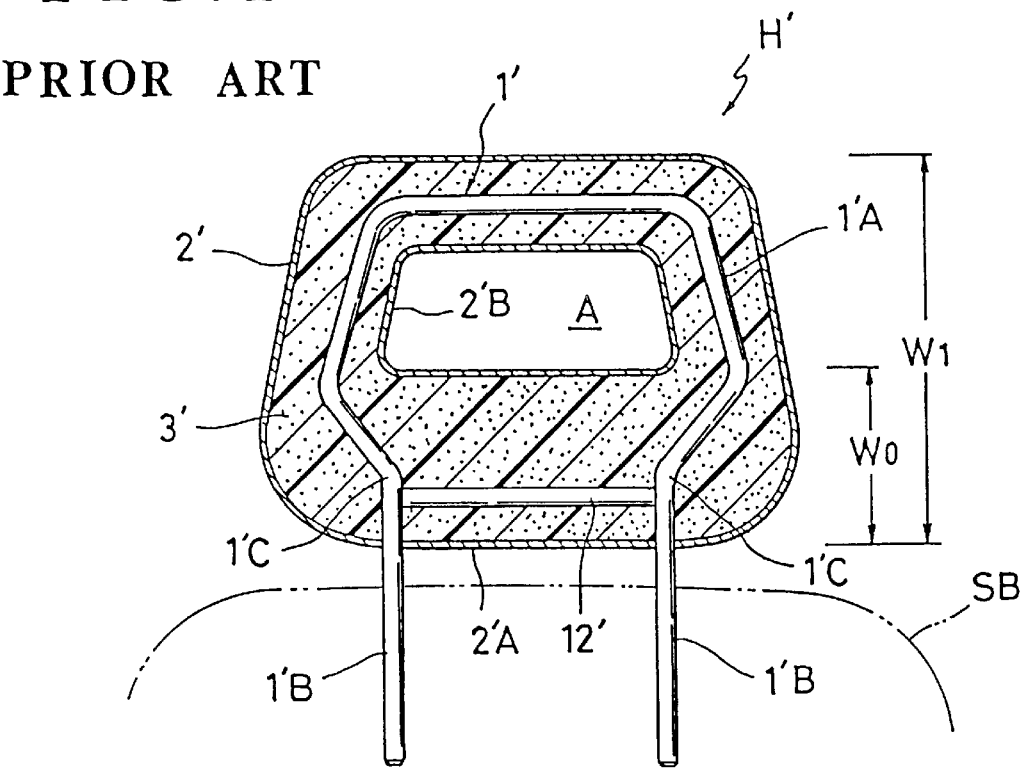
FIG. 1 is a schematic sectional view of conventional donut-like headrest.

With reference to FIG. 2 only, it is seen that, in contrast to the conventional headrests of this kind described earlier and shown in FIG. 1, the connecting frame (12) in accordance with the present invention is disposed above both inwardly bent juncture points (1C) and stay portions (10), with the result that, when the headrest frame (1) is placed in the donut-like trim cover assemlby (1), the closed annular area defined by the head support portion (1A) and connecting frame (12) may be so located as to circumscribe the through-hole (A) of trim cover assembly in good proportion. This in turns effectively reduces the height-wise thickness of lower area of trim cover assembly (2), as indicated by (W2), in relation to the whole height-wise dimension (W3), as compared with that (W0) of the prior-art headrest (H') in FIG. 1. Further, the two inwardly bent juncture points (1C)(1C) of headrest frame (1) may respectively be situated in two openings (0)(0) formed in the bottom wall (2A) of trim cover assembly (2). Hence, in accordance with the present invention, the volume of annular hollow or conduit of trim cover assembly (1) may be reduced inwardly towards the central through-hole (A) of a fixed size or diameter so as to make small the whole dimension of headrest body, while making long the two stay portions (10) (which may serve to increase a spacing between the bottom wall (2A) of trim cover assembly (2) and the top of seat back (SB) by comparative reference to FIGS. 1 and 2), in comparison with the prior-art headrest (H'). Consequently, the apparent size or diameter of through-hole (A) is made large, in the eyes of a person, in relation to the whole dimension of trim cover assembly (1) or headrest body, while at the same time, a space surrounding the headrest body is made wide to the eyes of person looking thereat around the whole body of headrest (H), whereby a driver or passenger can attain an enlarged field of vision to the opposite side of headrest (H) and can easily recognize most of a scene or an object behind the headrest (H).

In the process of forming the above-described headrest (H), the headrest frame (1) may be of such a type shown in FIG. 3 wherein the separate connecting frame (12) is provided, having two connecting end portions (12A)(12A) small in diameter relative thereto, and a pair of connecting holes (13)(13) are each formed midway in the respective two lower slant frame sections (11A)(11A) of headrest frame (1). Alternatively, the headrest frame (1) may be of such another type shown in FIG. 4 wherein the connecting frame (12) is integrally provided between the two lower slant frame sections (11A) of headrest frame (1) by welding (P). A worker may select one of those two modes, depending on one of the two currently known typical types of donut-like trim cover assembly (2), each being shown in FIGS. 3 and 4. This is just for choice of the two non-distinctive alternative modes that can be contemplated within the scope of the present invention, which also has in common the purpose of facilitating the ease with which the headrest frame (1) may be placed in the trim cover assembly (2), depending on the two slightly changed modes.

It should be again understood that the trim cover assembly (2) itself is of the known donut-like type, but, in accordance with the present invention, its whole dimension is made small, with the resultant apparent size or diameter of its through-hole (A) being made large relative to the whole dimension thereof, as stated above, and that this inventive aspect also gives a rise to additional advantages in the assembly of headrest (H), depending upon each of the above-noted two known modes of trim cover assembly (2), which will now be explained below.

Namely, FIG. 3 shows one exemplary applicability of the present invention to a donut-like trim cover assembly (2) of the known type having a slit (S) and two openings (0)(0) formed in the bottom wall (2A) thereof. Designation (UH) generally stands for an incomplete headrest unit, which is however shown in the exploded perspective manner in FIG. 3. It should be understood here that, as with known steps of foaming process of headrest, normally, the headrest frame (1) is placed in the trim cover assembly (2) to form one incomplete headrest unit (UH) (as presumable from FIG. 2, supposed that the foam cushion member (3) is not filled in the trim cover assembly (2)), which can readily be subjected to a subsequent foaming process, before obtaining the resulting complete headrest (H). According to the present mode, in a first step of forming the headrest (H), the headrest frame (1) should be provided, with the connecting frame (12) separate therefrom. Under this first stage, one of the two stay portions (10) be first inserted via the slit (S) into the trim cover assembly (2), and then, the headrest frame (H) be adjustingly circulated in the annular conduit of trim cover assembly (2), so that both two stay portions (10) thereof project from the respective two openings (0) of trim cover assembly (2). At this stage, the headrest support portion (1A) of headrest frame (1) may be displaced within the trim cover assembly (2) towards the side of bottom wall (2A). Thus, by doing such displacement, a worker can expose both two lower slant frame sections (11A)(11A) of headrest frame (1) externally from the slit (S) and two openings (0). This is realized due to the fact that the lower portion of trim cover assembly (2) adjacent the bottom wall (2A) is made small in height-wise width, as indicated at (W2) in FIG. 2, in comparison with the prior art. Then, as those two lower slant frame sections (11A) are exposed from the trim cover assembly (2) for access thereto, the two connecting end portions (12A) of connecting frame (12) should be fitted in the two respective connecting holes (13) each formed in the respective two lower slant frame sections (11A). Accordingly, the connecting frame (12) can be easily and quickly connected between the two lower slant frame sections (11A), exteriorly of the trim cover assembly (2). Then, all of the thus-exposed connecting frame (12) and two lower slant frame sections (11A) can be drawn into the trim cover assembly (2) and placed in position therewithin, as presumable from FIG. 2 without the foam cushion member (3) filled therein. At this moment, it is further appreciated that the two inwardly bent juncture points (1C) serve as a means for allowing easy location of both head support portion (1A) and two stay portions (10) with respect to the trim cover assembly (2), in contrast to the above-described prior arts. That is, a worker can easily locate them at a given position by simply setting the two inwardly bent juncture points (1C) at the respective two openings (0) of trim cover assembly (2). In that way, the incomplete headrest unit (UH) are quickly assembled. While not shown in the drawings, this incomplete headrest unit (UH) is then subjected to a foaming process, using a known foaming die device, so as to produce the resulting headrest (H) shown in FIG. 2, wherein both headrest support portion (1A) and connecting frame (12) are embedded in the foam cushion member (3) within the trim cover assembly (2).

On the other hand, FIG. 4 shows another alternative example that employs a donut-like trim cover assembly (2) of such known type having an annular slit (S) formed in and along the inward annular wall (2B) thereof and two openings (0)(0) formed in the bottom wall (2A) thereof, to which the present invention is also applicable. Likewise as in FIG. 3, designation (UH) generally stands for a basic construction of an incomplete headrest unit, which is however shown in the exploded perspective manner in FIG. 4, and it should be also understood that, as with known steps of foaming process of headrest, normally, the headrest frame (1) is placed in the trim cover assembly (2) to form one incomplete headrest unit (UH) which can readily be subjected to a subsequent foaming process, before obtaining the resulting complete headrest (H). In the present mode, at a first step, the headrest frame (1) should be provided, with the connecting frame (12) having been connected by welding (at P) integrally between the two lower slant frame section (11A) of headrest frame (1). Then, the two stay portions (10) of headrest frame (1) are passed through the annular slit (S) of trim cover assembly (2) and inserted through the respective two openings (0) thereof, projecting externally therefrom. Subsequent thereto, both head support portion (1A) and connecting frame (12) can be easily located at a given position in and along the annular hollow of trim cover assembly (2), due to the fact that the closed annular space defined by those head support portion (1A) and connecting frame (12) will surround or circumscribe the inward annular wall (2B) of trim cover assembly (2) more adjacent thereto in comparison with the head support portion (1'A) of the prior art shown in FIG. 1, and further due to the fact that, as stated likewise in the first mode of FIG. 3, the two inwardly bent juncture points (1C)(1C) of headrest frame (1) serves as a means for allowing easy location of both head support portion (1A) and two stay portions (10) with respect to the trim cover assembly (2), in contrast to the above-described prior arts. That is, a worker can easily locate them at a given position by simply setting the two inwardly bent juncture points (1C) at the respective two openings (0) of trim cover assembly (2). Though not shown, the thus-assembled incomplete headrest unit is then subjected to a foaming process, using a known foaming die device, so as to produce the resulting headrest (H) shown in FIG. 2.

Accordingly, commonly in both of the above-described two modes, the structure of headrest in the present invention achieves the following advantages, as mentioned earlier.

(I) The connecting frame (12) is disposed at the two lower slant frame sections (11A), so that the closed annular area defined by the head support portion (1A) and connecting frame (12) may adjacently surround the through-hole (A) in good proportion when the headrest frame (1) is placed in the headrest body or trim cover assembly (2). Hence, this effectively reduces the height-wise thickness of lower area of trim cover assembly (2), as indicated by (W2), in relation to the whole height-wise dimension (W3), and also the volume of annular hollow of trim cover assembly (1) may be reduced inwardly towards the central through-hole (A) of a fixed size or diameter so as to make small the whole size of headrest body, while making long the two stay portions (10), in comparison with the prior-art headrest (H'). Further, the polygonal formation of head support portion (1A) of headrest frame (1) permits the trim cover assembly to be formed in a more circular donut-like shape, rather than the illustrated relatively rectangular donut-like shape. Thus, it is possible to make slender and small the whole dimension of headrest body, while enlarging the apparent size or diameter of through-hole (A) relative to the whole dimension of headrest body, thereby not only improving its outer aesthetic appearance, but also widening the field of vision for a person to recognize a scene or object behind or beyond the headrest body, in this sort of see-through-type headrest.

(II) In this structure of headrest, the two inwardly bent juncture points (1C)(1C) of headrest frame (1) serve as a means for locating the headrest frame (1) with respect to the trim cover assembly (2), in the process of assembling the incomplete headrest unit (UH). By simply setting such two juncture points (1C) at the respective two openings (0) of trim cover assembly, a worker can easily and quickly locate the headrest frame (1) at a predetermined position in the trim cover assembly (2), while automatically determining an externally projecting proportion of the two stay portions (10) from the trim cover assembly (2).

While having described the present invention, it should be finally understood that the invention is not limited to the illustrated embodiments, but any other modifications, replacements and additions may structurally be applied thereto without departing from the scopes of the appended claims.

What is claimed is:

1. A structure of a headrest for use on a vehicle seat of a vehicle, comprising:

a generally donut-like body of the headrest having a through-hole formed therein;

a headrest frame means having a head support portion formed to support a head of an occupant who sits on the vehicle, and a pair of spaced-apart stay potions adapted for mounting on the vehicle seat;

said headrest frame means including a pair of spaced-apart slant portions defined between said headrest support portion and said pair of spaced-apart stay portions;

a connecting frame means engageable on and extending between said pair of spaced-apart slant portions of the headrest means to directly engage them together; and both of said headrest frame means and connecting frame means being disposed within said generally donut-like body of the headrest, with the connecting frame means being engaged on and extending between said pair of spaced-apart slant portions of the headrest frame means, in such a manner that said head support portion and connecting frame means are disposed within the generally donut-like body of headrest to surround said through-hole, with said pair of spaced-apart slant portions being also disposed within the generally donut-like body of the headrest, while said pair of spaced-apart stay portions respectively extend from the said pair of slant portions and project externally from a wall of the generally donut-like body of headrest.

2. The structure of headrest as defined in claim 1, wherein said headrest frame means includes a pair of inwardly bent juncture points respectively defined between said pair of spaced-apart slant portions and said pair of spaced-apart stay portions, said pair of inwardly bent juncture points being defined by bending a portion of said headrest frame means in a direction inwardly thereof at a juncture point where the headrest frame means communicates with said pair of spaced-apart slant portions, and wherein said pair of inwardly bent juncture points are engaged in said wall of the generally donut-like body of headrest.

3. The structure of headrest as defined in claim 1, wherein said headrest frame means is formed by bending a rigid material into such a configuration that the head support portion thereof assumes a polygonal shape including said pair of spaced-apart slant portions and that the pair of spaced-apart stay portions thereof each respectively extend linearly from said pair of spaced-apart slant portions, and wherein said connecting frame means is engaged on and extends between said pair of spaced-apart slant portions.

4. The structure of headrest as defined in claim 1, wherein said headrest frame means is so formed as to reduce an annular area defined by said head support portion and connecting frame means in an inward directions towards said through-hole, so that both said headrest support portion and connecting frame means extend adjacently along said through-hole, whereby the generally donut-like body of headrest enclosing the head support portion and connecting frame means therein may be reduced in thickness uniformly, with an apparent size or diameter of said through-hole being made large relative to a whole dimension of the generally donut-like body of headrest.

5. The structure of headrest as defined in claim 1, wherein said pair of spaced-apart slant portions are formed with two connecting holes, wherein said connecting frame means comprises a connecting frame separate from said headrest frame, said connecting frame having a pair of connecting end portions, and wherein said connecting frame means is directly engaged on and extends between said pair of spaced-apart slant portions by fitting a said pair of connecting end portions in the respective said two connecting holes.

6. A structure of headrest for use on a vehicle seat, comprising:

a generally donut-like three-dimensional trim cover assembly having a through-hole defined therein and an inner annular hollow defined therein;

a headrest frame means having a head support portion for supporting a head of an occupant who sits on the vehicle seat, and a pair of spaced-apart stay portions adapted for mounting on the vehicle seat;

said head support portion being large in width relative to said pair of spaced-apart stay portions and disposed in said inner annular hollow of the generally donut-like three-dimensional trim cover assembly;

said pair of spaced-apart stay portions projecting externally from a wall of said generally donut-like three-dimensional trim cover assembly;

said headrest frame means including a pair of spaced-apart slant portions defined between said head support portion and said pair of spaced-apart stay portions;

a connecting frame means engaged on and extending between said pair of spaced-apart slant portions of the headrest frame means to thereby connect them together; and a foam cushion member which is filled by a foaming in said generally donut-like three-dimensional trim cover assembly together integrally with said head support portion, pair of spaced-apart slant portions and connecting frame means, while said pair of spaced-stay portions project externally from said one wall of the generally donut-like three-dimensional trim cover assembly;

wherein said head support portion and connecting frame means are disposed within the inner annular hollow of the donut-like three-dimensional trim cover assembly, surrounding said through-hole, with said pair of spaced-apart slant portions being also disposed within the inner annular hollow of the generally donut-like three-dimensional trim cover assembly, while said pair of spaced-apart stay portions respectively extend from said pair of slant portions and project externally from said wall of the generally donut-like body of headrest.

7. The structure of headrest as defined in claim 6, wherein said headrest frame means includes a pair of inwardly bent juncture points defined between said pair of spaced-apart slant portion and said pair of spaced-apart stay portions, said pair of inwardly bent juncture points being defined by bending a portion of said headrest frame means in a direction inwardly thereof at a juncture point where the headrest frame means communicates with said pair of spaced-apart slant portions, and wherein said pair of inwardly bent juncture points are situated in said wall of the generally donut-like body of headrest.

8. The structure of headrest as defined in claim 6, wherein said headrest frame means is formed by bending a rigid material into such a configuration that the head support portion thereof assumes a polygonal shape including said pair of spaced-apart slant portions therein and that the pair of spaced-apart stay portions thereof each respectively extends linearly from said pair of spaced-apart slant portions, wherein said connecting frame means is engaged on and extends between said pair of spaced-apart slant portions, and wherein the head support portion and connecting frame means are disposed in and along the inner annular hollow of the generally donut-like three-dimensional trim cover assembly such as to surround said through-hole.

9. The structure of headrest as defined in claim 6, wherein said headrest frame means is so formed as to reduce an annular area defined by said head support portion and connecting frame means in an inward direction towards said through-hole, so that both said headrest support portion and connecting frame means extend adjacently along said through-hole, whereby the generally donut-like body of headrest enclosing the head support portion and connecting frame means therein may be reduced in thickness uniformly, with an apparent size or diameter of said through-hole being made large relative to a whole dimension of the generally donut-like body of headrest.

10. The structure of headrest as defined in claim 6, wherein said headrest frame means includes a pair of inwardly bent juncture points defined between said pair of spaced-apart slant portion and said pair of stay portions, said pair of inwardly bent juncture points being defined by bending a portion of said headrest frame means in a direction inwardly thereof at a juncture point where the headrest frame means communicates with said pair of spaced-apart slant portions, wherein said generally donut-like three-dimensional trim cover assembly is formed with a slit and a pair of openings at said one wall thereof, wherein said pair of spaced-apart slant portions are formed with two connecting holes, wherein said connecting frame means comprises a connecting frame separate from said headrest frame means, said connecting frame having a pair of connecting end portions, wherein said connecting frame is engaged on and extending between said pair of spaced-apart slant portions by securely fitting said pair of connecting end portions of the connecting frame in said pair of connection holes, respectively, wherein both of said headrest frame means and connecting frame connected thus thereto are inserted via said slit and pair of openings into the generally donut-like three-dimensional trim cover assembly and placed therein, with said pair of inwardly bent juncture points being situated substantially in said pair of openings of the generally donut-like three-dimensional trim cover assembly, respectively, prior to said foaming.

11. The structure of headrest as defined in claim 6, wherein said generally donut-like three-dimensional trim cover assembly includes an inward annular wall defining said through-hole, wherein said headrest frame means includes a pair of inwardly bent juncture points defined between said pair of spaced-apart slant portion and said pair of stay portions, said pair of inwardly bent juncture points being defined by bending a portion of said headrest frame means in a direction inwardly thereof at a juncture point where the headrest frame means communicates with said pair of spaced-apart slant portions, wherein said generally donut-like three-dimensional trim cover assembly is formed with an annular slit in and along the inward annular wall thereof and a pair of openings at said wall thereof, wherein said connecting frame means comprises a connecting frame fixedly engaged on and extending between said pair of spaced-apart slant portions, wherein both of said headrest frame means and connecting frame are inserted via said annular slit into the generally donut-like three-dimensional trim cover assembly and placed therein, while projecting said pair of spaced-apart stay portions externally from the respective said two openings of the generally donut-like three-dimensional trim cover assembly, so that said pair of inwardly bent juncture points are situated substantially in said pair of openings, respectively, prior to said foaming.

* * * * *